United States Patent
Barnard et al.

(10) Patent No.: US 9,214,149 B2
(45) Date of Patent: Dec. 15, 2015

(54) TRANSDUCER AND SYSTEM OF ARRANGEMENT FOR A PANEL ARRAY

(75) Inventors: Thomas J. Barnard, Baldwinsville, NY (US); Thomas M. Canavan, Tully, NY (US); Dane E. Reiner, Liverpool, NY (US); Jennifer L. Pawelczyk, Syracuse, NY (US); Casey D. Dyer, Liverpool, NY (US); Joseph E. Nickerson, Fairfax, VA (US); John H. Goodemote, Sauquoit, NY (US); Dennis C. Stimson, Baldwinsville, NY (US); Howard R. Taylor, Centreville, VA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 13/463,649

(22) Filed: May 3, 2012

(65) Prior Publication Data

US 2013/0033969 A1 Feb. 7, 2013

Related U.S. Application Data

(60) Provisional application No. 61/481,846, filed on May 3, 2011.

(51) Int. Cl.
*G10K 11/00* (2006.01)
*G01S 1/72* (2006.01)

(52) U.S. Cl.
CPC ............ *G10K 11/006* (2013.01); *G01S 1/72* (2013.01)

(58) Field of Classification Search
USPC ............................................ 367/141, 149
See application file for complete search history.

(56) References Cited

U.S. PATENT DOCUMENTS

| | | | |
|---|---|---|---|
| 7,206,258 B1 * | 4/2007 | Fisher et al. | 367/141 |
| 7,295,493 B1 * | 11/2007 | Ames | 367/149 |
| 2007/0297287 A1 * | 12/2007 | Robertsson et al. | 367/24 |
| 2008/0316866 A1 * | 12/2008 | Goodemote et al. | 367/151 |
| 2010/0017138 A1 * | 1/2010 | Brady et al. | 702/14 |
| 2011/0176385 A1 * | 7/2011 | Lambert | 367/24 |

* cited by examiner

*Primary Examiner* — James Hulka
(74) *Attorney, Agent, or Firm* — Billion & Armitage; Richard E. Billion (57) ABSTRACT

A sensor system includes a pressure sensor portion, and an accelerometer. Outputs from the sensor system are handled by a signal processing system that includes a first beamforming module for inputs from a pressure sensor, a second beamforming module for inputs from an accelerometer, and an adaptive beam interpolation module. A method for signal processing signals from both a pressure sensor and an accelerometer. An array of sensors transfers data wirelessly.

16 Claims, 12 Drawing Sheets

Our proposed stack is 40% thinner than the baseline

FIG. 16

TRANSDUCER AND SYSTEM OF ARRANGEMENT FOR A PANEL ARRAY

RELATED APPLICATIONS

This application claims the benefit under 35 U.S.C. §119 (e) of prior U.S. Provisional Patent Application No. 61/481, 846, filed May 3, 2011, which is incorporated herein by reference.

TECHNICAL FIELD

Various embodiments described herein relate to a system and a method for forming a pressure sensor and for forming a panel that includes a number of pressure sensors. The sensors and the panel are used for receiving acoustic sound in the water. In one embodiment, the sensors are used on vessels, such as a submarine, as part of a Sonar system.

BACKGROUND

Sonar is a well known apparatus having both civilian and military applications. Sonar (originally an acronym for SOund Navigation And Ranging) is a technique that uses sound propagation, usually underwater, to navigate, communicate with or detect other vessels. Sonar uses sensors placed in arrays to receive sound. The arrays can be deployed in many ways. Some sonar arrays are towed behind a ship or submarine. Towing an array of sensors or hydrophones presents many problems. Amongst the problems are keeping the tow lines straight during vessel maneuvers. Another way to deploy an array is by mounting sensors to the hull of a ship, such as a submarine. Hull mounted sonar arrays are generally built up from separate components at several hull mount sites on a hull. Typically, there are a number of hull mount sites that are aligned along the starboard side of the hull and an equal number of hull mount sites aligned along the port side of the hull. Each hull mount site includes a baffle, a signal conditioning plate (also referred to as an SCP), a vibration isolation module (also referred to as a VIM), an array of sensors, and an outer decoupler (also referred to as an ODC). As mentioned, each of these separate components is placed on the hull one after the other. The building process is time consuming as it takes time to build up each site. In addition, many of the separate components are bulky and heavy.

The signal conditioning plate is attached to the baffle. The signal conditioning plate bounces incoming signals back towards the wet-side to the mounted sensors to produce a reflection gain at the sensors in the array. The signal conditioning plate is made of materials so that it can be tuned to produce gain in the frequency of interest.

In order to provide signal enhancement of the incident signals, baffles have been developed to improve the signal-to-noise ratio on hull mounted sonar arrays. Baffles tend to prevent hull noise. Also, in order to achieve this desired result, outside decouplers in the past have been designed to perform two functions, namely: (1) to provide, in conjunction with a signal conditioning plate, the proper impedance backing for one or more hydrophones included in the array; and (2) to isolate or decouple flow noise from the incident signals which tends to undesirably degrade the overall performance of the system.

With regard to the first function, an ideal signal conditioning device is one which when placed directly behind the hydrophones operates to enhance the signal response at all frequencies without introducing phase shifts. In known prior art apparatus, thick steel plates having pressure release, i.e. low impedance, backings have been used to approach this end. However, as the need for improved performance requires the use of lower and lower operating frequencies, the thicknesses and weight requirements for the steel plate structures have become prohibitive from a practical standpoint.

The vibration isolation module is attached to the signal conditioning plate. The vibration isolation module provides attachment points for the array of sonar sensors that decouple the array from the normal hull vibrations. The vibration isolation module main purpose is to substantially prevent or lessen unwanted noise from vibrations of the hull from reaching the sensors.

Hull-mounted acoustic array panels typically require a sensor module architecture customized for the host platform in question. Existing hull-mounted acoustic array panels use either pressure sensors or accelerometers, along with a baffle/SCP tuned to that particular element. The customization required adds to the cost of the acoustic array panels.

Hull-mounted acoustic array panels typically mount a sensor module onto the Signal Conditioner Plate (SCP). The electronics associated with the sensor (amplifiers etc.) typically reside in an off-board "bottle" which lies to the side, or on top of, these modules. In order to form a continuous array of sensors, this architecture dictates either two rows of column-based stave modules, or two columns of row-based ones. This basically means that each platform requires a separate set of custom stave modules to span the desired acoustic aperture. In addition, the staves of sensors are wired so that if one sensor fails, the remaining sensors in the stave also fail.

In many instances, the individual sensors are made from solid ceramic plates or solid ceramic blocks and so are also heavy. Heavy sensors result in a heavy array of sensors. The heavy arrays add to the weight to the assembly needed for a hull mounted array. The staves are also wired together and with signals being carried out to rails on the side of the sensor array. The stave architecture is also somewhat inflexible. Each set of staves is custom designed for each platform on which the sensors are placed. When attaching staves of sensors to other platforms, a new custom design is made specific to the platform.

As mentioned previously, the current panels are heavy. The baffle that forms part of the acoustic array panel is one of the heavier portions of the panel. The individual sensors include a solid ceramic plates or solid ceramic blocks and add to the weight of the panel.

In ship building, it is a constant goal to make the vessel lighter. Another goal is to make components more reliable. Still a further goal includes making the components easier to install.

DETAILED DESCRIPTION

Figure 1:
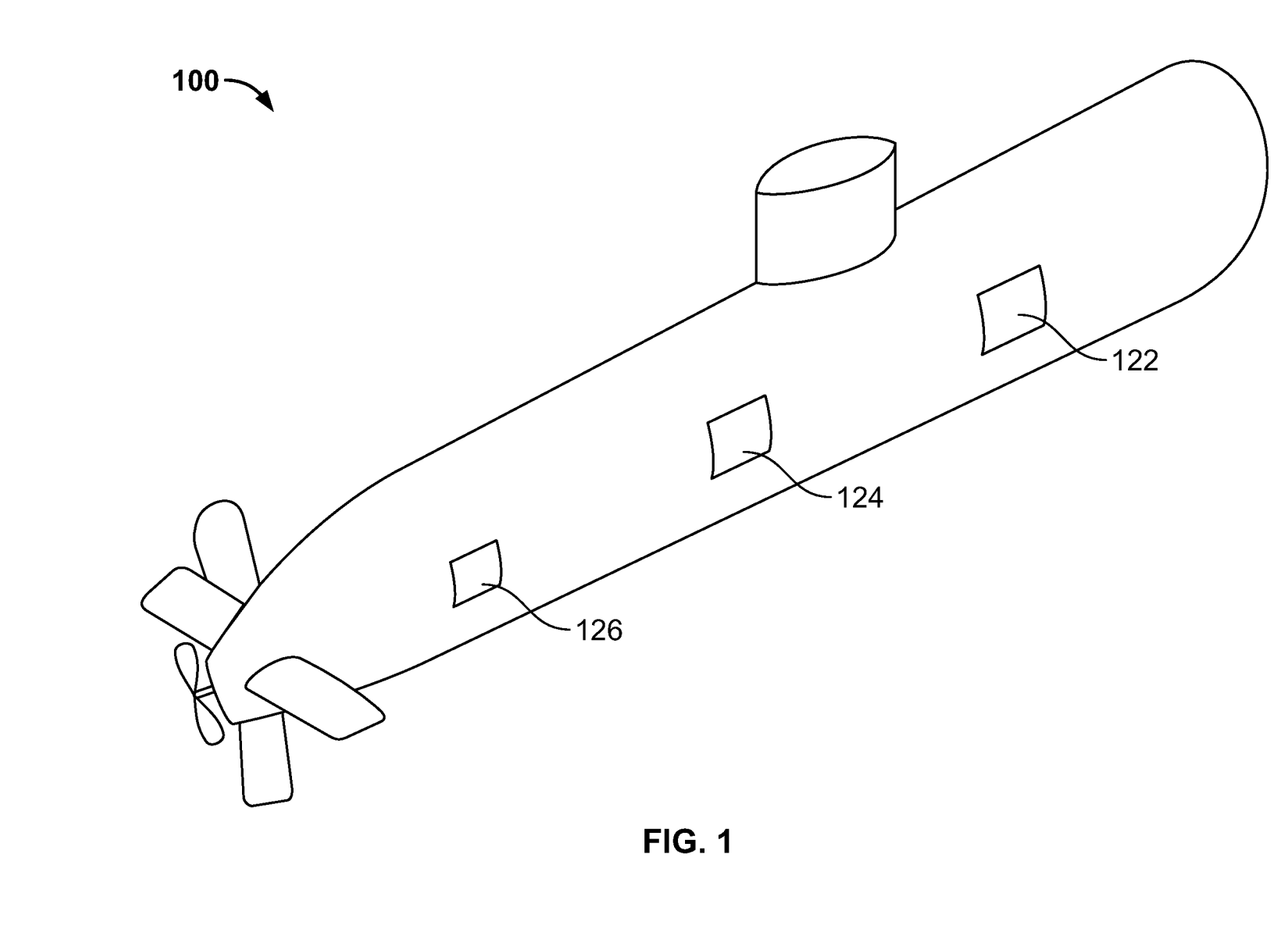
FIG. 1 is a side view of a vessel including an array of sonar sensors, according to an example embodiment.

FIG. 1 is a side view of a vessel 100 including an array of sonar sensors 120, according to an example embodiment. The vessel 100 is a submarine. It should be understood that other types of vessels may also include an array of sonar sensors. The array of sonar sensors 120 includes a number of subarrays of sonar sensors that are added to other components to form a panel, such as panels 122, 124, 126. The vessel's 100 port side is shown with three panels 122, 124, 126 that include sonar sensors. The panels 122, 124, 126 are positioned along the port side of the vessel 100. The starboard side of the vessel 100 also includes three similarly positioned panels (not shown) of sonar sensors. In total, there are six panels on the vessel that form the array 120. It should be noted that other arrays can have a different number of panels. Some vessels 100 may include more panels and some vessels may include less panels to form an array of sensors.

Figure 2:
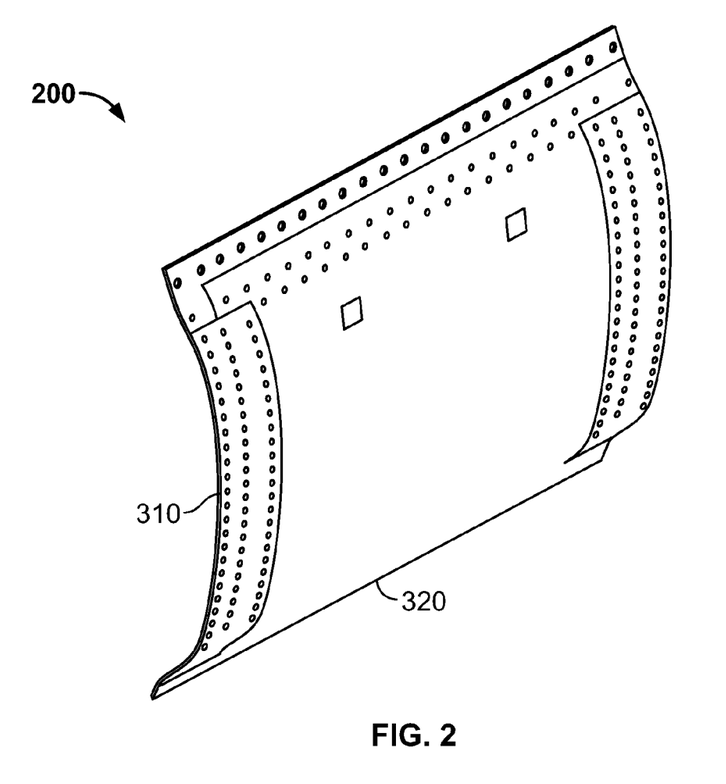
FIG. 2 is a perspective of a portion of the array in which a baffle, SCP, and VIM are one molded piece, according to an example embodiment.
Figure 3:
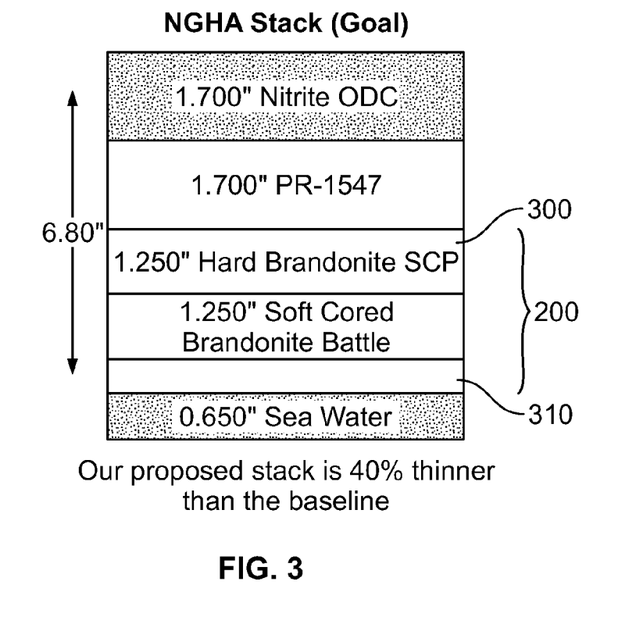
FIG. 3 is a schematic cross sectional view of one site of the array, according to an example embodiment.

FIG. 2 is a perspective view of a portion of the one of the panels, such as panel 122, of the array of sonar sensors 120, according to an example embodiment. FIG. 3 is a schematic cross sectional view of one of the subarrays or panels, such as panel 122, according to an example embodiment. Now referring to both FIGS. 2 and 3, the panel 122 will be further detailed. As shown, the panel 122 includes a one piece molded assembly 200 that includes a baffle 310, an SCP 320. A VIM 330 is used to mount the one piece molded assembly 200 to the hull of the vessel 100. The one piece molded assembly 200 is formed by molding the baffle 310, and molding the SCP 320. These two are then attached to one another and bonded. As shown in FIG. 3, layer 310 corresponds to the baffle 310 and layer 320 corresponds to the SCP 320. A layer 312 represents the portion that bonds the baffle 310 and the SCP 320. It is contemplated that the baffle 310, the SCP 320, and the VIM 330 can also be formed in successive stages into a one piece molded assembly with a first molding operation, a time for allowing the injected material to set up, followed by a second molding operation with a time for allowing a second portion of injected material to set up, followed by a third molded operation to mold in a VIM 330. FIG. 3 shows that entire panel thickness that includes the one piece molded portion is in the range of 6.00"-8.00". As shown in FIG. 3, the thickness is approximately 6.80". The total thickness of a conventional panel that is built up on a hull of a vessel is generally much larger. The example embodiment shown in FIGS. 2 and 3 is much thinner than the currently fabricated built up panel. In fact, the panel that includes the one piece molded portion 200 is approximately 30% to 50% thinner than panels fabricated using current methods. Thicker, conventionally fabricated panels, generally use more material and are therefore is heavier.

Figure 5:
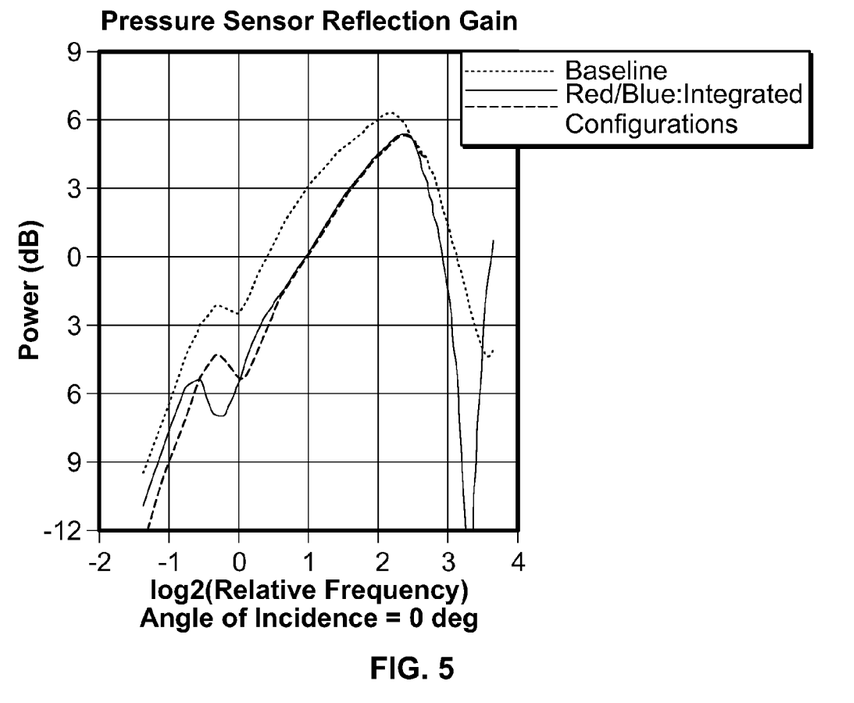
FIG. 5 is a graph showing the gain of a conventional baseline stack compared to the gain of the stack formed according to the example embodiment shown in FIG. 3.

FIG. 5 is a graph showing the gain of a conventional baseline stack 510 compared to the gain of the stack formed according to the example embodiment 520 shown in FIG. 3. FIG. 5 is a plot of the log 2 of the relative frequency on the x axis verses the power in decibels (dB) on the y-axis. The graph shows that there is a bit of loss in the reflection gain 520 of the configuration of the stack with the one piece molded part 200 (labeled the integrated configurations) when compared to the reflection gain of the conventional or baseline stack 510. However, the amount of the loss in reflection gain 520 is considered insignificant. In addition, when considering the lesser amount of weight as well as the cost savings for attaching the integrated stack when compared to building it up as is currently done, the amount of loss in reflection gain is considered insignificant.

Figure 6:
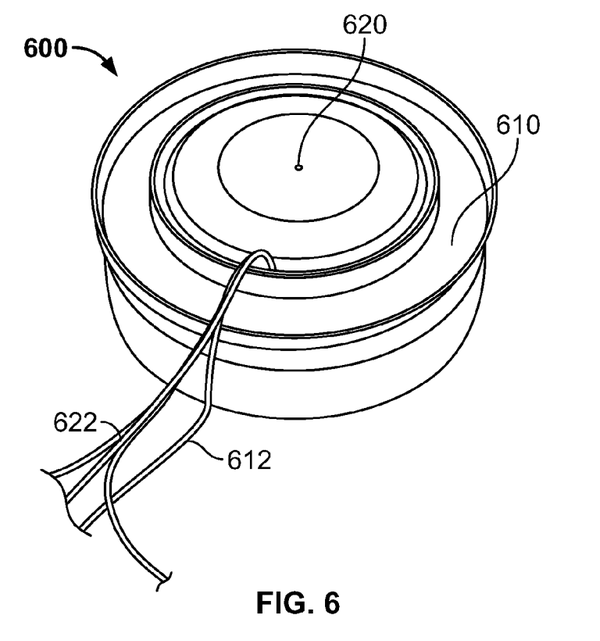
FIG. 6 is a perspective view of a dual sensor, according to an example embodiment.

FIG. 6 is a perspective view of a dual sensor 600, according to an example embodiment. The dual sensor 600 includes a pressure sensor 610 and an accelerometer 620. The pressure sensor 610 is co-located with the accelerometer 620. The output from the pressure sensor 610 is omnidirectional. The output from an accelerometer 620 is directional. In short the output from the accelerometer 620 can be represented by a cosine function. Ownship noise, or noise coming from the vessel 100 (see FIG. 1), will produce a positive signal at the pressure sensor 610 since the output from the pressure sensor is omnidirectional. The same ownship noise will produce a negative noise value at the accelerometer 620 since the output from the accelerometer is directional. Therefore, ownship noise will substantially cancel when using signals from both an accelerometer 620 and a signal from a pressure sensor 610. One of the main functions of the baffle 310 (shown in FIG. 3) is absorbing the noise from the vessel 100. Using the dual sensor 600 allows for a thinner baffle since the noise from the vessel 100, or ownship noise will cancel. The dual sensor 600 also includes a first wire 612 for carrying an output signal from the pressure sensor 610 and a second wire 622 for carrying an output signal from the accelerometer 620.

Figure 7:
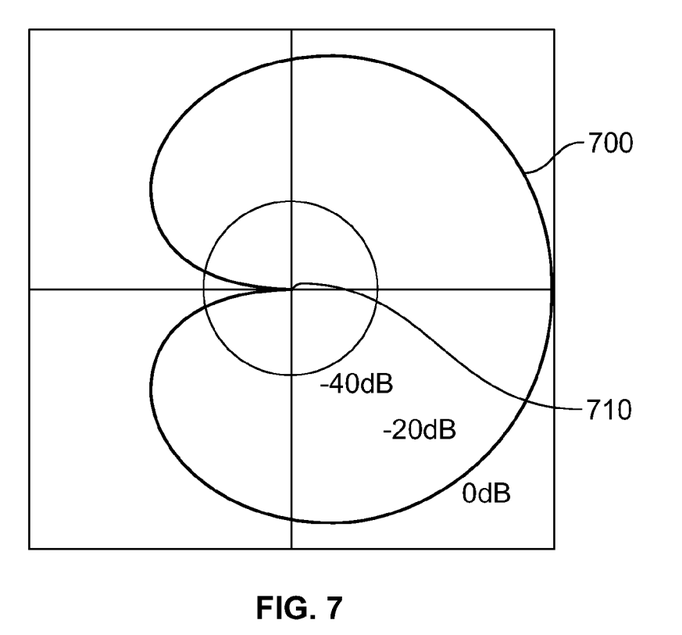
FIG. 7 is a graph of the ideal output of the dual sensor, according to an example embodiment.

FIG. 7 is a graph 700 of the ideal output of the dual sensor 600, according to an example embodiment. The output of the dual sensor 600 is actually a combination of the output from the pressure sensor 610 and the output from the accelerometer 620. In one embodiment, the output of the pressure sensor 610 and the output of the accelerometer 620 are not combined at the dual sensor 600. The combined signal can be represented mathematically as the pressure at an angle θ, by the following equation:

$$P(\theta) = \frac{1}{4}(1+\cos\theta)^2$$

where θ is zero along a line that extends radially outward from the vessel and which is substantially perpendicular to the surface of the vessel and the surface of the acoustic panel, such as panel 122 (shown in FIG. 1) and is outboard from the panel, and where θ is 180 degrees along the same line on the inboard direction that extends between the panel and the vessel which correlates to ownvessel noise. The contribution of the pressure sensor 610 is the value "1" and the contribution of the velocity sensor (accelerometer) is represented by "cos θ". Therefore, at zero degrees cos θ is a value of 1 and the pressure sensor value of 1 adds to the accelerometer portion to form a value of 2 within the brackets. Squaring the value in the brackets and dividing the value by 4 makes pressure equal to 1 when received from the sea. Alternatively, when θ is at 180 degrees, the cos θ value is −1 and the pressure value is 1 which drops the pressure to zero or produces a node for ownvessel noise which comes from the vessel. This formula produces a node when the angle θ equals 180 degrees or for noise that comes from the inboard direction. Combining the inputs from the pressure sensor 610 and the accelerometer 620 results in a vector sensor with a significantly lower backlobe, or node 710 in the inboard direction.

FIG. 7 is the theoretical view of the combined inputs from the pressure sensor 610 and the accelerometer 620. As a practical matter, the pressure sensor 610 and the accelerometer 620 can each have phase noise. The phase noise between the accelerometer 620 and the pressure sensor 610 can effectively throw off the alignment between the accelerometer 620 and the pressure sensor 610, even if perfectly aligned physically. When a phase error is introduced, the backlobe or node 710 becomes much less pronounced. For this reason, in some embodiments, the input from the pressure sensor 610 and the accelerometer 620 are not combined at the sensor 600 level since any phase error introduced by phase noise from each of the pressure sensor 610 and accelerometer 620 will be difficult to remove.

Figure 8:
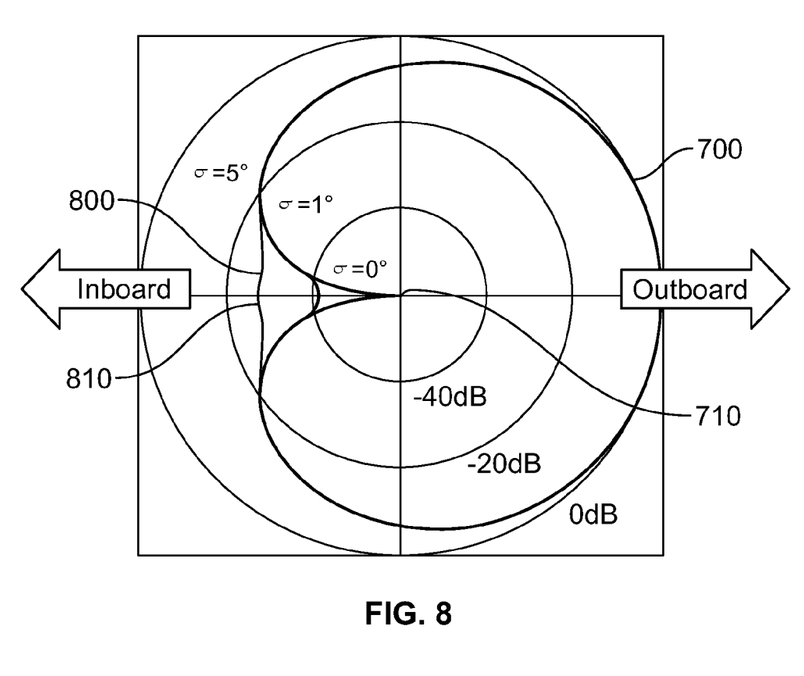
FIG. 8 is a graph of an output of the dual sensor that includes the ideal output and an output with a phase error, according to an example embodiment.

FIG. 8 is a graph of an output of the dual sensor that includes the ideal output 700 and an output with a phase error 800, according to an example embodiment. The backlobe 710 of the ideal carotid 700 is very deep and near or at the value of zero while the value of the "backlobe" with a phase error of 5 degrees has a value which is nearly 0.40. With such a value, the ownvessel noise would not be substantially canceled out but would rather be at a 40% or so level.

Figure 9:
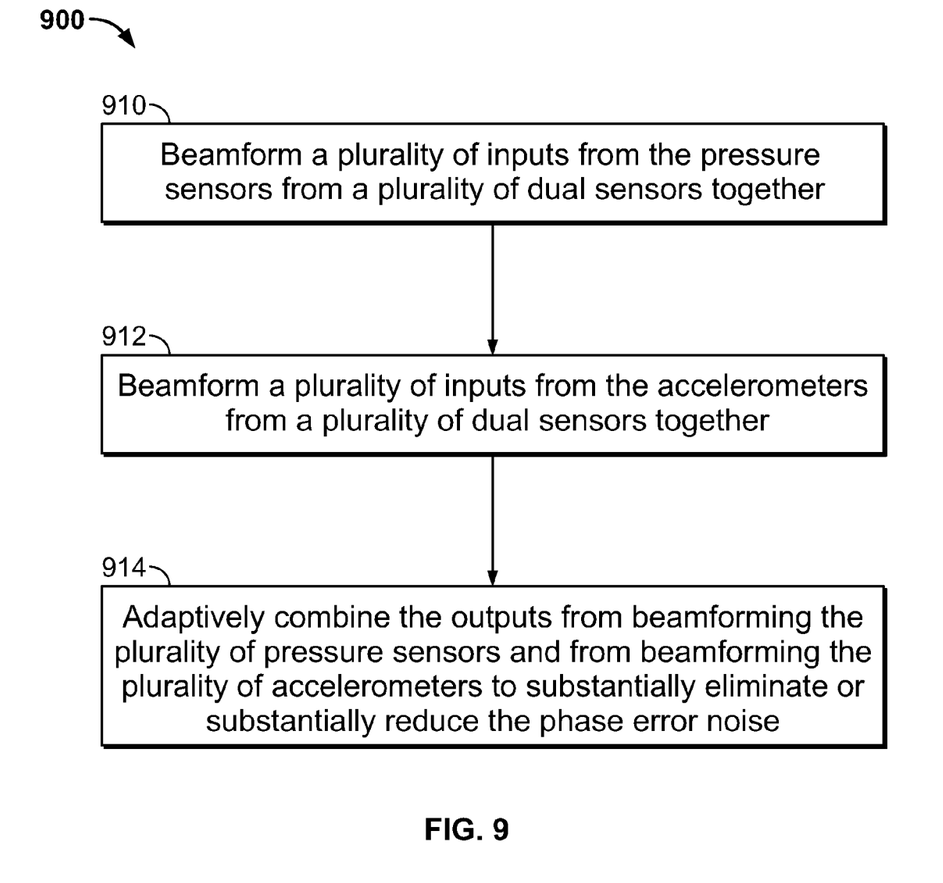
FIG. 9 is a flowchart of the method of signal processing the inputs from a plurality of pressure sensors and a plurality of accelerometers from a plurality of dual sensors, according to an example embodiment.

To correct for the phase noise between the pressure sensor 610 and the accelerometer 620 for the dual sensors 600, a signal processing method is used to substantially correct the phase error. FIG. 9 is a flowchart of the method 900 of signal processing the inputs from a plurality of pressure sensors and a plurality of accelerometers from a plurality of dual sensors, according to an example embodiment. The method 900 of signal processing includes beamforming a plurality of inputs from the pressure sensors 910 from a plurality of dual sensors 600 together. The method 900 also includes beamforming a plurality of inputs from the accelerometers 912 from a plurality of dual sensors 600 together. The outputs from beamforming the plurality of pressure sensors and from beamforming the plurality of accelerometers are adaptively combined 914 to substantially eliminate or substantially reduce the phase noise.

Figure 10:
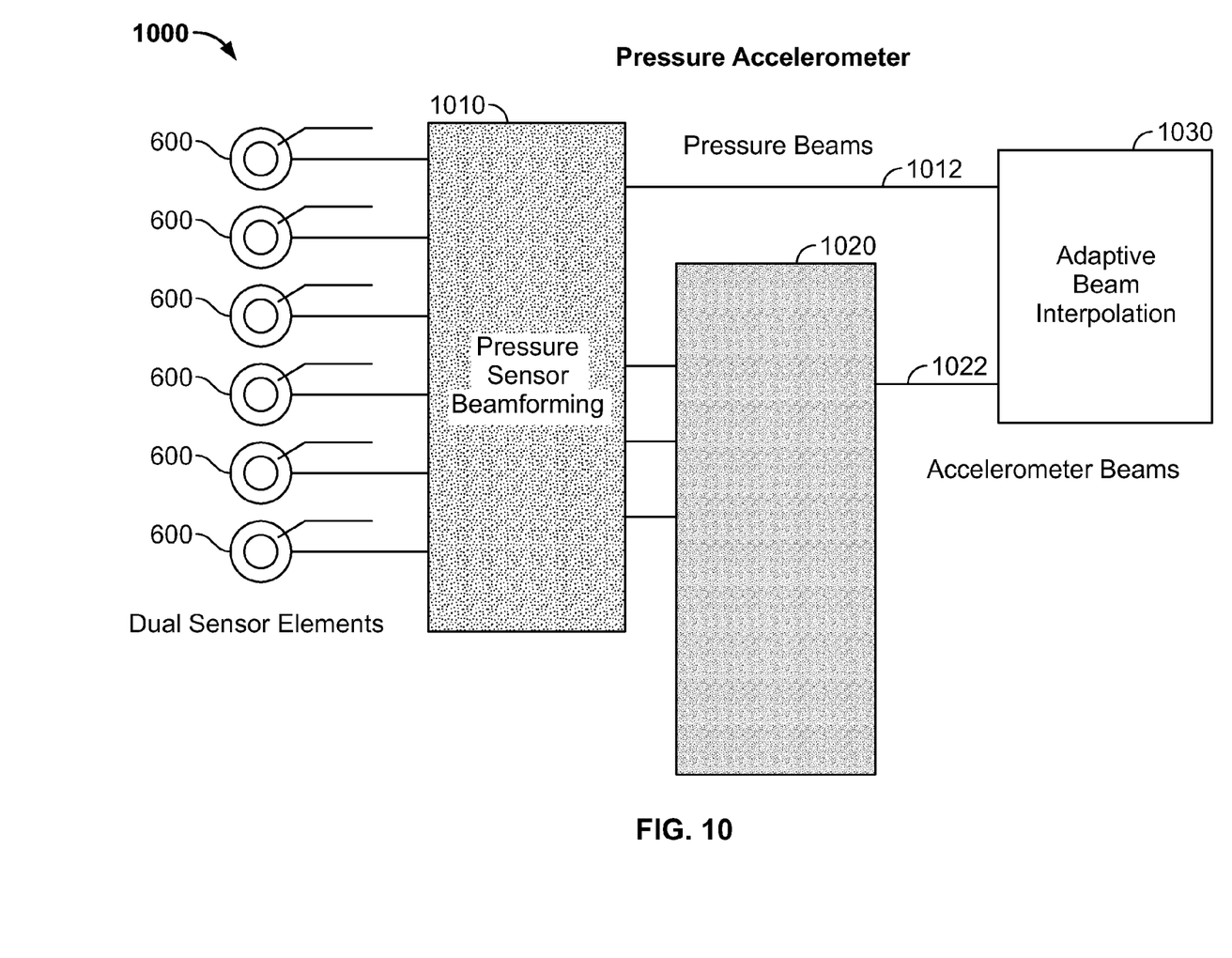
FIG. 10 is a schematic apparatus for combining the outputs from the dual sensor, according to an example embodiment.

FIG. 10 is a schematic apparatus 1000 for combining the outputs from the dual sensor 600, according to an example embodiment. The apparatus 1000 includes a pressure sensor beamforming module 1010 and an accelerometer beamforming module 1020, and an adaptive beam interpolation module 1030. Outputs from the plurality of the pressure portions of a plurality of dual sensors 600 are input to the pressure sensor beamforming module 1010. In addition, outputs from the plurality of the accelerometer portions of a plurality of dual sensors 600 are input to the accelerometer beamforming module 1020. The pressure sensor beamforming module 1010 produces a pressure beam output 1012 which is input to the adaptive beam interpolation module 1030. The accelerometer beamforming module 1010 produces an accelerometer beam output 1022 which is also input to the adaptive beam interpolation module 1030. The adaptive beam interpolation module 1030 adaptively combines the beams formed from each sensor field.

Beamforming can be used for both radio or sound waves, such as the soundwaves in water received by a sonar array. Beamforming is a signal processing technique used in sensor arrays for directional signal transmission or reception. This is achieved by combining elements in the array in such a way that signals at a particular angle experience constructive interference and while others experience destructive interference. Beamforming can be used at both the transmit and receiver side to achieve spatially selectivity. The improvement compared with an omnidirectional reception is known as the receive gain. Adaptive beamforming is used to detect and estimate the signal-of-interest at the output of a sensor array by means of data-adaptive spatial filtering and interference rejection.

It should be noted that the pressure sensor beamforming module 1010, the accelerometer beamforming module 1020, and the adaptive beam interpolation module 1030 may include a computer hardware portion and a computer software portion. In some embodiments, the pressure sensor beamforming module 1010, the accelerometer beamforming module 1020, and the adaptive beam interpolation module 1030 can be formed from only hardware. In other embodiments, the pressure sensor beamforming module 1010, the accelerometer beamforming module 1020, and the adaptive beam interpolation module 1030 can be formed from only software. It should be noted that each of the pressure sensor beamforming module 1010, the accelerometer beamforming module 1020, and the adaptive beam interpolation module 1030 may have software components and when the software is executed on a generalized computer, the generalized computer becomes a specialized machine. It should also be noted that the method discussed above with respect to FIG. 9 can be a computerized method.

Figure 11:
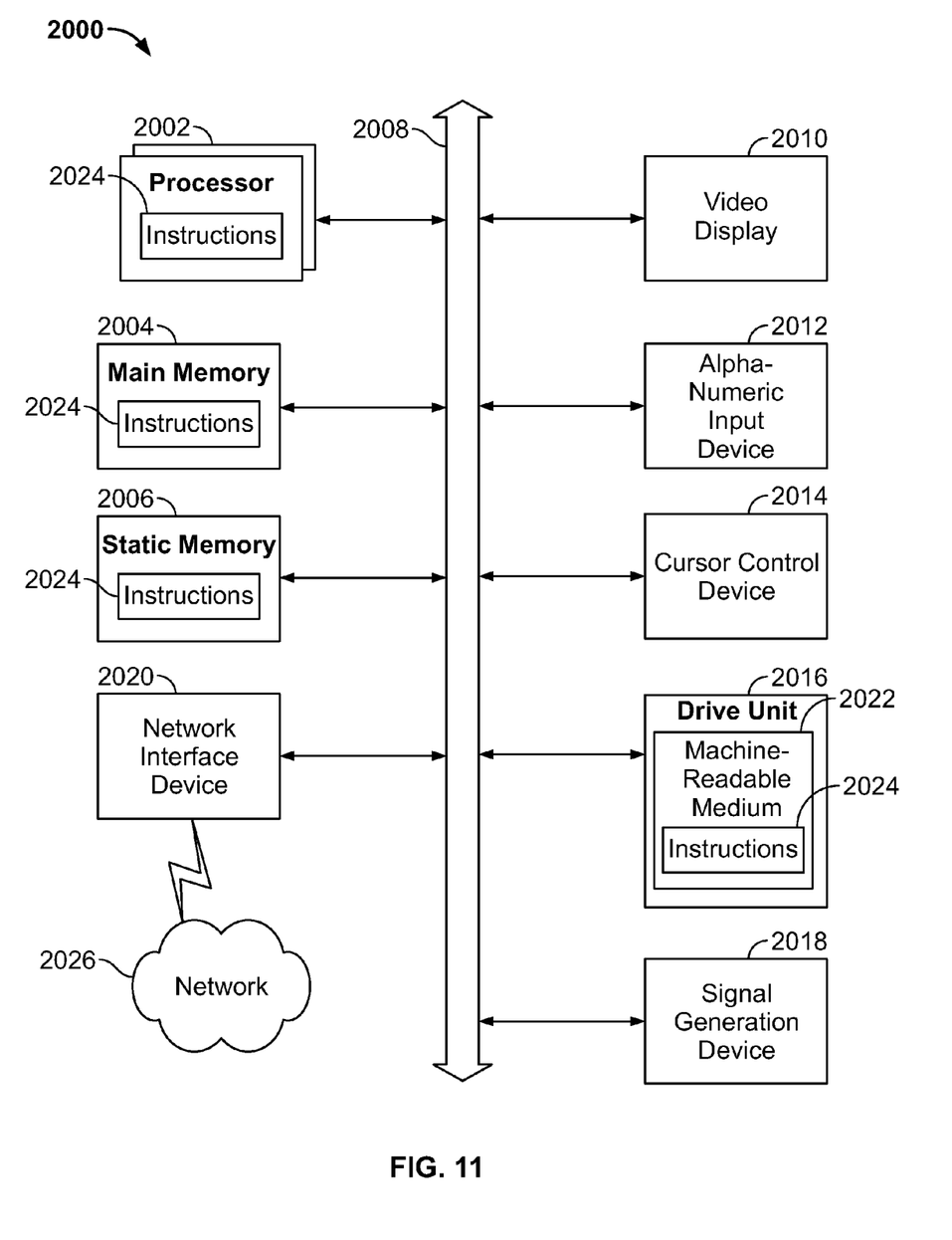
FIG. 11 shows a diagrammatic representation of a computer system 2000, within which a set of instructions is included for causing the machine to perform any one or more of the phase error correction methodologies discussed herein, according to an example embodiment.

FIG. 11 shows a diagrammatic representation of a computer system 2000, within which a set of instructions for causing the machine to perform any one or more of the phase error correction methodologies discussed herein can be executed or is adapted to include the apparatus for phase correction as described herein. In various example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a portable music player (e.g., a portable hard drive audio device such as a Moving Picture Experts Group Audio Layer 3 (MP3) player, a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2000 includes a processor or multiple processors 2002 (e.g., a central processing unit (CPU), a graphics processing unit (GPU), arithmetic logic unit or all), and a main memory 2004 and a static memory 2006, which communicate with each other via a bus 2008. The computer system 2000 can further include a video display unit 2010 (e.g., a liquid crystal displays (LCD) or a cathode ray tube (CRT)). The computer system 2000 also includes an alphanumeric input device 2012 (e.g., a keyboard), a cursor control device 2014 (e.g., a mouse), a disk drive unit 2016, a signal generation device 2018 (e.g., a speaker) and a network interface device 2020.

The disk drive unit 2016 includes a computer-readable medium 2022 on which is stored one or more sets of instructions and data structures (e.g., instructions 2024) embodying or utilized by any one or more of the methodologies or functions described herein. The instructions 2024 can also reside, completely or at least partially, within the main memory 2004 and/or within the processors 2002 during execution thereof by the computer system 2000. The main memory 2004 and the processors 2002 also constitute machine-readable media.

The instructions 2024 can further be transmitted or received over a network 2026 via the network interface device 2020 utilizing any one of a number of well-known transfer protocols (e.g., Hyper Text Transfer Protocol (HTTP), CAN, Serial, or Modbus).

While the computer-readable medium 2022 is shown in an example embodiment to be a single medium, the term "computer-readable medium" should be taken to include a single medium or multiple media (e.g., a centralized or distributed database, and/or associated caches and servers) that store the one or more sets of instructions and provide the instructions in a computer readable form. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, tangible forms and signals that can be read or sensed by a computer. Such media can also include, without limitation, hard disks, floppy disks, flash memory cards, digital video disks, random access memory (RAMs), read only memory (ROMs), and the like.

It should be noted that the method discussed with respect to FIG. 9 can be a flow diagram associated with a computerized method, according to an example embodiment. When the computerized method 900, discussed above, is programmed into a memory of a general purpose computer, the computer and instructions form a special purpose machine. The instructions, when programmed into a memory of a general purpose computer, are in the form of a non transitory set of instructions.

The example embodiments described herein can be implemented in an operating environment comprising computer-executable instructions (e.g., software) installed on a computer, in hardware, or in a combination of software and hardware. Modules as used herein can be hardware or hardware including circuitry to execute instructions. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method(s) can be written in any number of suitable programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Figure 12:
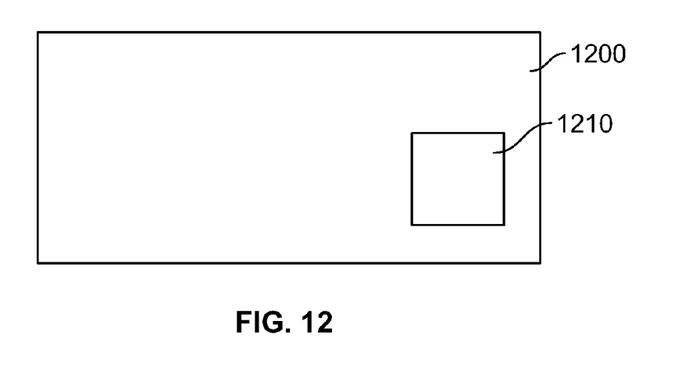
FIG. 12 is a schematic drawing of a machine readable medium that includes an instruction set, according to an example embodiment.

FIG. 12 is a schematic drawing of a machine readable medium 1200 that includes an instruction set 1210, according to an example embodiment. The machine-readable medium 1200 that provides instructions 1210 that, when executed by a machine, cause the machine to perform operations including beamforming a plurality of inputs from the pressure sensors 910 from a plurality of dual sensors 600 together, and beamforming a plurality of inputs from the accelerometers 912 from a plurality of dual sensors 600 together. The instructions 1210 can also use the outputs from beamforming the plurality of pressure sensors and from beamforming the plurality of accelerometers and adaptively combine these outputs to substantially eliminate or substantially reduce the phase noise.

The present disclosure refers to instructions that are received at a memory system. Instructions can include an operational command, e.g., read, write, erase, refresh, etc., an address at which an operational command should be performed, and the data, if any, associated with a command. The instructions can also include error correction data.

Figure 13A:
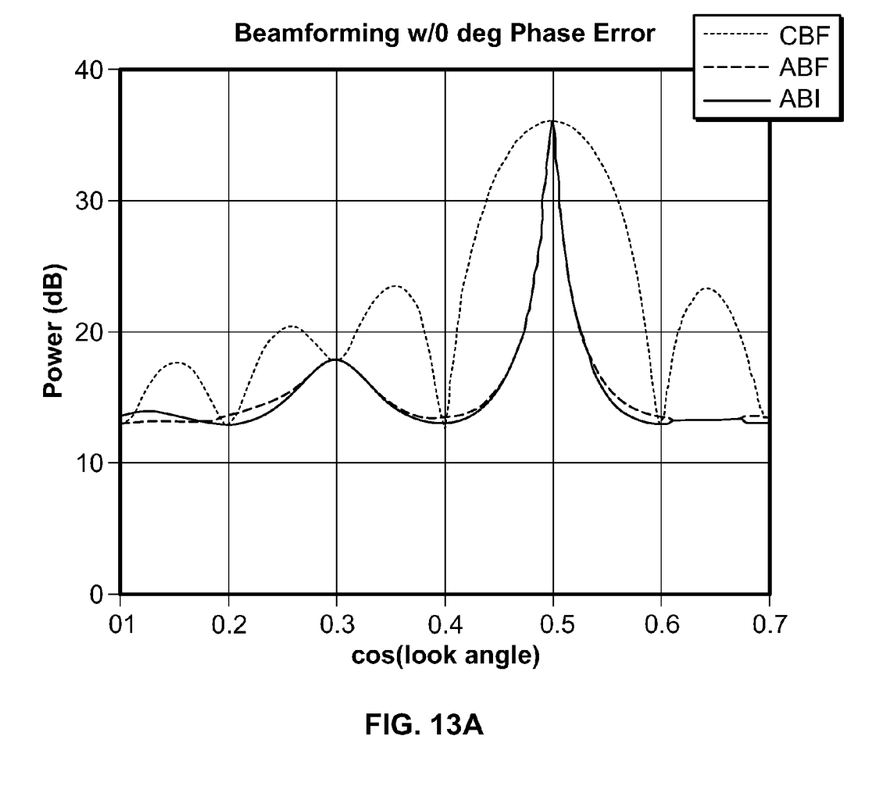
FIG. 13A is a graph of an output from beam forming with zero phase error, according to an example embodiment.
Figure 13B:
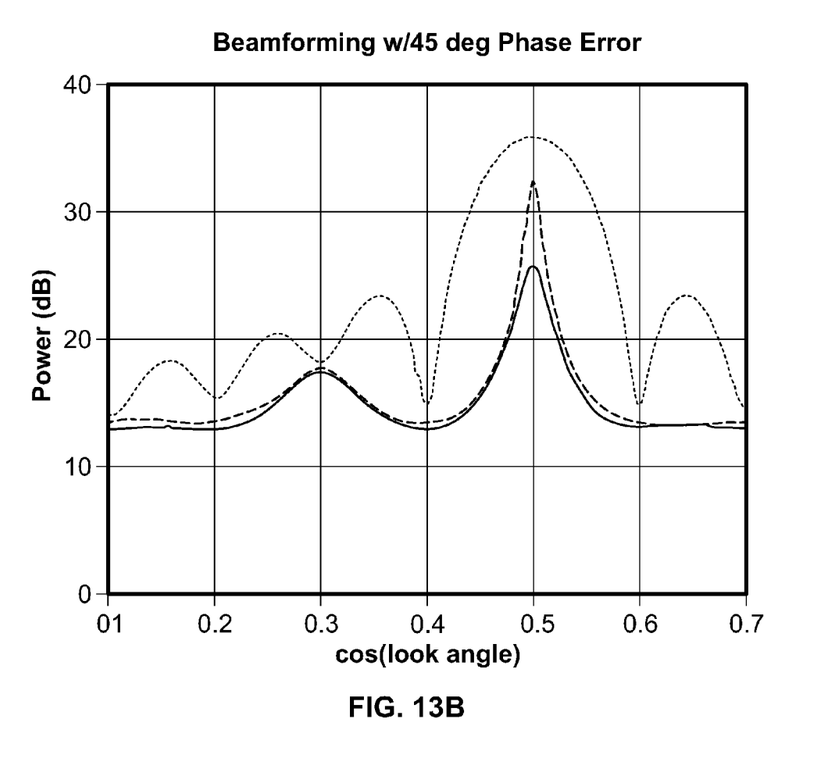
FIG. 13B is a graph of an output from beam forming with 45 degree phase error, according to an example embodiment.

FIG. 13A is a graph of an output from beam forming with zero phase error, according to an example embodiment. FIG. 13B is a graph of an output from beam forming with 45 degree phase error, according to an example embodiment. Now referring to both of these graphs, it can be seen, that for an array of the dual sensors 600, beam-space adaptive processing is less susceptible to phase noise than element-based approaches. The first stage beamformer averages out most of the phase errors. The result is that the signals from the zero phase error device and the 45 degree phase error device are very similar despite the phase error.

Figure 14:
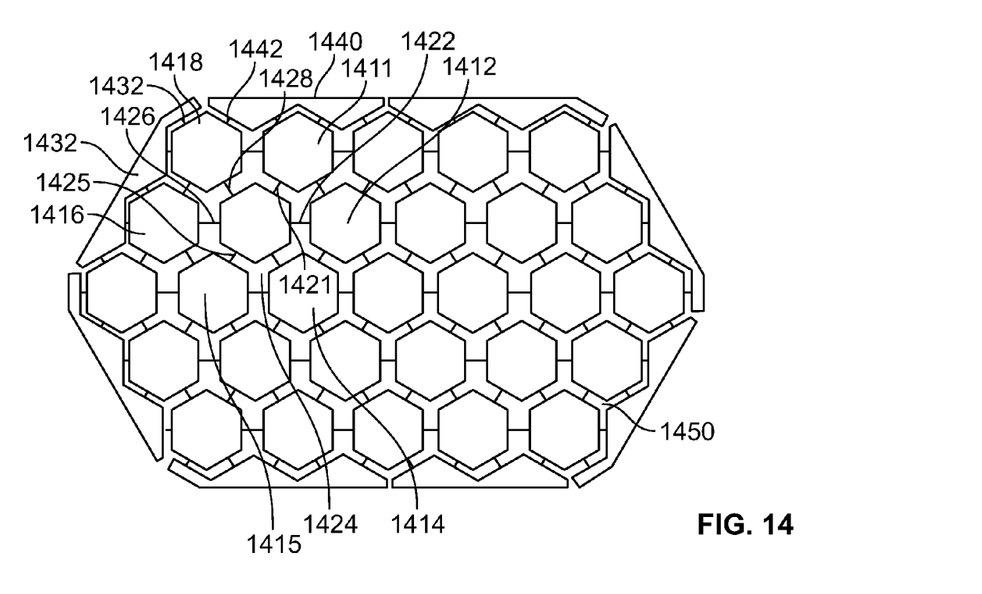
FIG. 14 is a top view of a layer of modules of sensors that form a portion of a panel, such as the panels shown in FIG. 1, according to an example embodiment.

FIG. 14 is a top view of a layer 1400 of modules 1410, 1411, 1412 of sensors that form a portion of a panel, such as panel 122 (shown in FIG. 1), according to an example embodiment. For example, the modules 1410, 1411, 1412, 1414, 1415, 1416, 1418 are communicatively coupled to other modules 1410, 1411, 1412, 1414, 1415, 1416, 1418. As shown in FIG. 14, the module 1410 is communicatively coupled to the modules surrounding module 1410, namely 1411, 1412, 1414, 1415, 1416, and 1418. The communicative coupling between the modules is shown as connectors 1421, 1422, 1424, 1425, 1426, and 1428. The connectors 1421, 1422, 1424, 1425, 1426, and 1428 can be hardwire connections or wireless connections. Most of the modules in the layer of modules 1400 is communicatively coupled to other surrounding modules. Modules that are on or near the edge of the array also attach to one or more edge portions. For example, module 1418 includes a connection 1432 to edge portion 1430, and a connection 1442 to edge portion 1440. The edge portion, such as edge portion 1430 and edge portion 1440 communicate to the electro-optical hull penetrator (EOHP). As a result, each module is communicatively coupled with surrounding modules. This forms a network of modules that communicate through one another. In the event that one module fails, the surrounding modules have a number of alternate communication paths through the other modules in the array or in the layer of the array. This system, then, is more robust than a panel that includes staves, since the modules in the stave or the sensors in the stave have limited coupling to adjacent modules in the stave. If one module in the stave fails, all the modules in that stave fail. This system can be thought of as a mesh network of modules having improved reliability. The mesh network also enables array expansion in any dimension so that, for a given platform, the array can be easily customized using standard parts or modules as needed for a particular platform. This allows for faster installation and more flexibility in forming the arrays. As shown in FIG. 14, the modules, such as modules 1410, 1411, 1412, 1414, 1415, 1416, 1418, have a hexagonal footprint or are hexagonally-shaped. It should be noted that the modules can also be formed with other shapes. The modules, such as modules 1410, 1411, 1412, 1414, 1415, 1416, 1418, are pluggable to a backplane 1450. The modules can be plugged to the backplane or removed from the backplane as needed. The result is a "borderless" module that enables a scalable array architecture capable of supporting a wide array of platforms.

Figure 15:
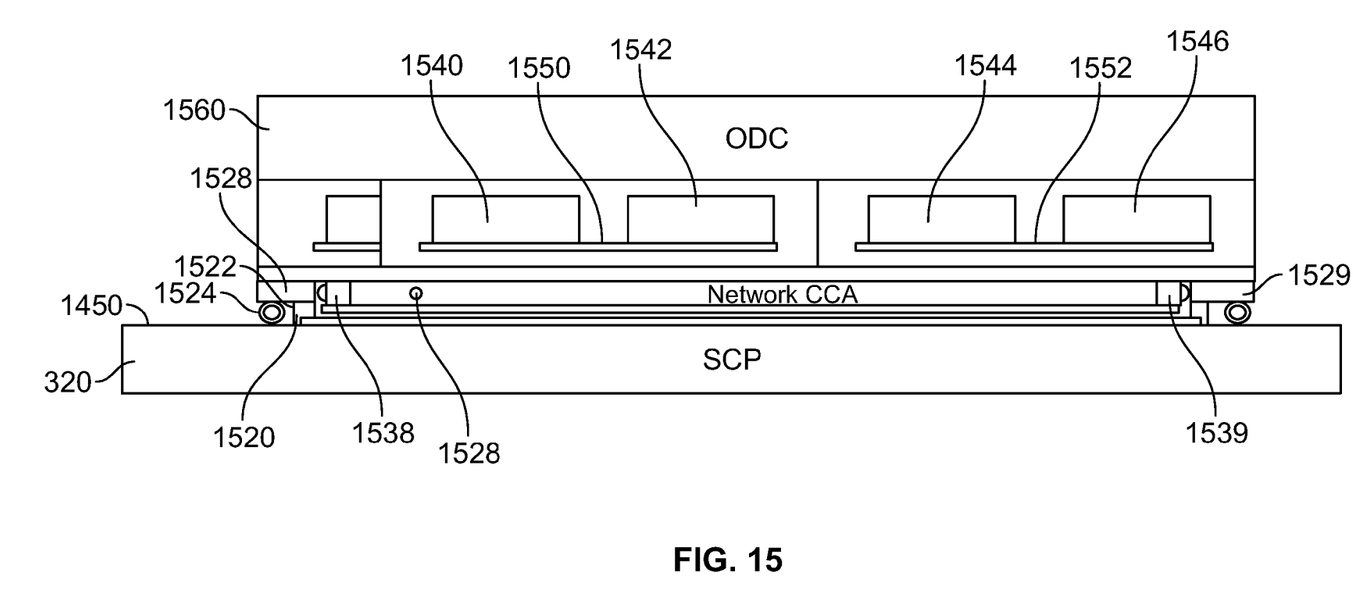
FIG. 15 is a cross sectional side view of a module on a portion of the backplane, according to an example embodiment.

FIG. 15 is a cross sectional side view of a module 1510 on a portion of the backplane 1450, according to an example embodiment. The backplane 1450 includes the signal conditioning plate 320 (shown in FIGS. 2 and 3). A setback base 1520 is attached to the back plane 1450. The setback base 1520 includes a cableway 1522 proximate the edge of the setback base. The cableway 1522 is sized to receive and accommodate a power cable 1524 for powering the sensors in the array as well as the electronics associated therewith. The setback base 1520 also includes a network circuit card assembly ("CCA") 1530. The network circuit card assembly 1530 includes at least one network interface card ("NIC") 1531 (see FIG. 16). In one embodiment, there is a network interface card for each of the sensors in the module 1510. The module 1510 includes a plurality of sensors, such as sensors 1540, 1542, 1544, 1546. In one embodiment, the sensors 1540, 1542, 1544, 1546 are dual sensors, such as those discussed above that include both a pressure sensor and an accelerometer. The network circuit card assembly 1530 also includes a first transceiver 1538 and a second transceiver 1539 for receiving signals from the network card and outputting the same as well as for receiving inputs and transferring the same to the network circuit card assembly 1530. In some embodiments, the transceivers 1538, 1539 are optical transceivers. In such an embodiment, the setback base 1520 includes an optic window 1528 positioned near the first optical transceiver 1538 and an optic window 1529 positioned near the second optical transceiver 1539. The optic windows 1528, 1529 are capable of sending and receiving signals to and from the transceivers 1538, 1539, respectively. The setback base 1520 includes an oil filled cavity 1528. The network circuit card assembly 1530 and the transceivers 1538, 1539 are positioned within the oil filled cavity 1528. Positioned near the sensors 1540, 1542, 1544, 1546 are signal circuit cards (or signal conditioning cards) 1550, 1552 ("SCC"). The SCCs are positioned between the sensors 1540, 1542, 1544, 1546 and the backplane 1450 or the SCP 320. Some would describe the position of the SCCs as behind the sensors 1540, 1542, 1544, 1546. This provides for a much more compact design. The SCCs are positioned behind the sensors 1540, 1542, 1544, 1546 rather than in "bottles" at the edge of a panel. The position of the SCCs near the sensors 1540, 1542, 1544, 1546 also has the advantage of processing the sensed signals near the sensor before additional noise or loss of signal occurs from transferring the signal over longer conductors. The module 1510 also includes an outer decoupler ("ODC") 1560. The ODC is attached to the outbound side of the module 1510. The module 1510 is designed to be pressed into a locked position on the backplane 1450 and specifically into a locked position in the setback base 1520.

Figure 16:
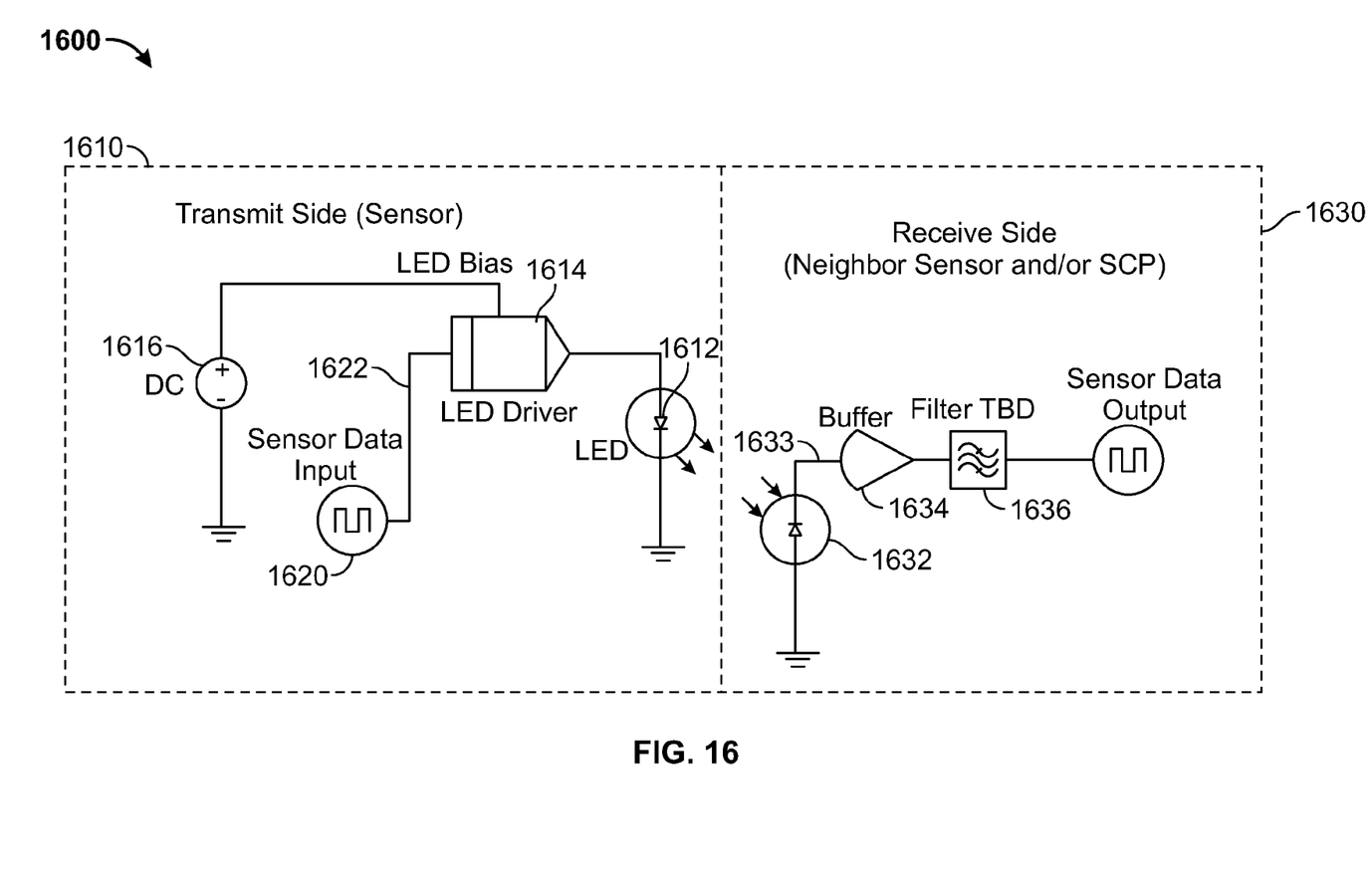
FIG. 16 is a schematic view of an optical data transfer system associated with an embodiment of the transceiver shown in FIG. 15.

FIG. 16 is a schematic view of an optical data transfer system 1600 associated with an embodiment of the transceiver 1539. The optical data transfer system 1600 includes a transmit side 1610 and a receive side 1630. The transmit side 1610 includes a LED 1612, an LED driver 1614, and a power source 1616. When a sensor 1620 detects pressure or detects pressure and velocity, it produces a sensor output 1622. This is input to the LED driver 1614. The power source 1616 is also input to the LED driver 1614. The LED driver outputs an LED bias to pulse the LED responsive to the sensor output 1622 which represents the sensor data. The receive side 1630 includes a photodetector 1632, a buffer 1634, a filter 1636. The photodetector 1632 is positioned near the LED 1612. In the alternative, an optical link is placed between the photodector 1632 and the LED 1612, such as the optic window 1529 (shown in FIG. 15). In another embodiment, an optic fiber can be used to optically link the photodetector 1632 and the LED 1612. The photodector 1632 produces an output signal 1633 in response to received light from the LED 1612. The signal is input to a buffer 1634 and then input to a filter 1636. In one embodiment, the filter 1636 is a digital filter and is used to condition the signal so that it properly represents the data received at the sensor. The optical data transmission system 1600 is capable of transmitting data at a rate of at least 10 MHz which is on the order of at least 20 Megabytes/second (Mbps). It is contemplated that optical data transmission systems having higher capacity can also be formed.

Figure 4:
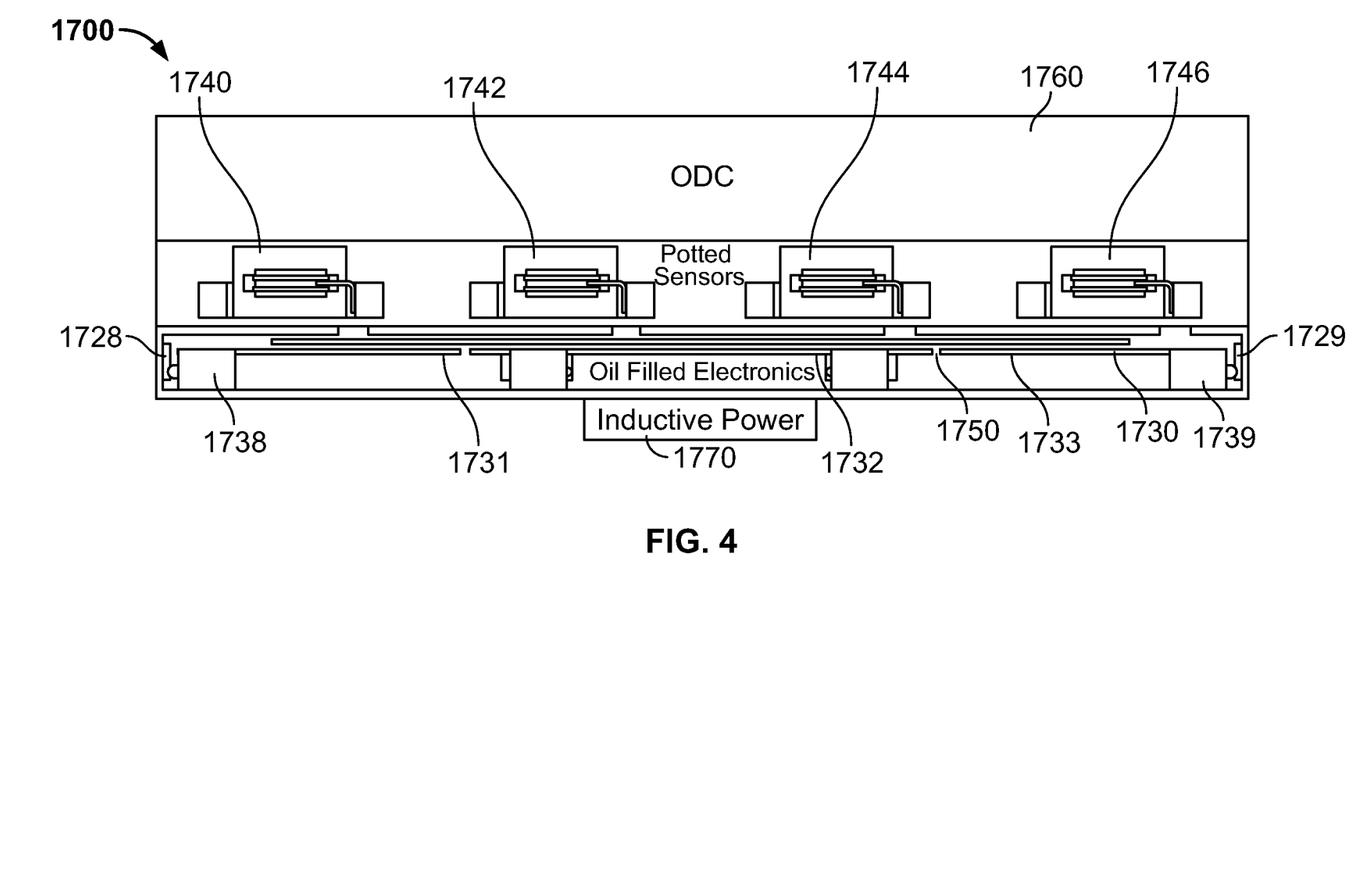
FIG. 4 is a cross sectional side view of a module and base, according to an example embodiment.

FIG. 4 is a cross sectional side view of a module 1710 and base 1720, according to an example embodiment. The base 1720 is adapted to be attached to the back plane, similar to the backplane 1450 (shown in FIG. 15). The base 1720 also includes a network circuit card assembly ("CCA") 1730. The network circuit card assembly 1730 includes a plurality of network interface cards ("NICs") 1731, 1732, 1733. The network circuit card assembly 1730 also includes a first transceiver 1738 and a second transceiver 1739 for receiving signals from the NICs 1731, 1732, 1733 and the network CCA 1730 and outputting the same, as well as for receiving inputs and transferring the same to the network CCA 1730. In some embodiments, the transceivers 1738, 1739 are optical transceivers. In one example embodiment, the transceivers 1738, 1739 are Very Fast IrDA ("VFIR") transceivers. The VFIR specification defines short-range, low-power operation at 16 Mpbs (half duplex). All VFIR devices are also required to support Fast Infrared ("FIR") and Serial Infrared ("SIR") operation. Each NIC 1731, 1732, 1733 provides network connection of one or more sensors to a network.

The module 1710 includes a plurality of sensors, such as sensors 1740, 1742, 1744, 1746. In one embodiment, the sensors 1740, 1742, 1744, 1746 are dual sensors, such as those discussed above that include both a pressure sensor and an accelerometer. The sensors 1740, 1742, 1744, 1746 are potted. In another example embodiment, the sensors 1740, 1742, 1744, 1746 are oil-filled subassemblies. In still another embodiment, the module 1710 is an assembly that is substantially oil-filled. Positioned near the sensors 1740, 1742, 1744, 1746 is a signal circuit card (or signal conditioning card) 1750 ("SCC"). The SCC is positioned behind the sensors 1740, 1742, 1744, 1746.

The base 1720 includes an optic window 1728 positioned near the first optical transceiver 1738 and an optic window 1729 positioned near the second optical transceiver 1739. The optic windows 1728, 1729 are capable of sending and receiving signals to and from the transceivers 1738, 1739, respectively. The setback base 1520 includes an oil filled cavity 1728. The network circuit card assembly 1730, the SCC 1750, and the transceivers 1738, 1739 are positioned within the oil filled cavity 1728. The module 1710 also includes an outer decoupler ("ODC") 1760. The ODC 1760 is attached to the outbound side of the module 1710. The module 1710 is designed to be pressed into a locked position on the backplane 1450 and specifically into a locked position. An inductive power source 1770 is coupled to the module 1710. The inductive power source 1770 provides power to the electronics of the module 1710 as well as to the other electronics associated with the panel, such as panel 122 (shown in FIG. 1). The embodiments described above result in a redundant wireless mesh network of sensors that includes a scalable hull-array module with electronics underneath the sensor. Data is transferred wirelessly.

A hull-mounted sensor array including at least one sensor having a pressure sensor, and a velocity sensor substantially co-located with the pressure sensor. The velocity sensor is an accelerometer. In one embodiment, the pressure sensor is substantially cylindrical in shape, and has a central axis. The velocity sensor is located near the central axis of the pressure sensor. In some embodiments, the velocity sensor includes a portion that is on or associated with the central axis. The pressure sensor produces a first signal in response to differences in pressure and the velocity sensor produces a second signal in response to differences in velocity. The first signal and the second signal are combined during a portion of a frequency range. In another portion of the frequency range, is used without the second signal in another portion of the frequency range. The first signal and second signal, in one embodiment, communicated to electronics remote from the sensor for signal processing. The first signal and second signal are combined to substantially cancel noise at a selected direction from the sensor array. The gain includes a backlobe for rejecting noise from the selected direction. In one embodiment, a signal conditioning plate is associated with the array of sensors and has a thickness in the range of 0.49 inches to 0.15 inches. In another embodiment, the range is 0.35 inches to 0.20 inches, and in still another embodiment, the range is 0.27 inches to 0.22 inches, and in yet another embodiment, the range is 0.26 inches to 0.23 inches. The sensor is part of an array of sensors which are associated with an acoustically hard signal conditioning plate, such as a signal conditioning plate having a specific acoustic resistance in excess of $3 \times 10^5$ grams/cm$^2$/second.

An array of sensors includes a first module including at least one sensor, a second module including at least one sensor, and a baffle that includes electronics. The first module and the second module are attached to the baffle. The first module and the second module are communicatively coupled wirelessly through a seawater medium to the electronics of the baffle. In one embodiment, at least the first module and the second module include a transparent window and the baffle includes a photodetector. The photodetector is positioned proximate the transparent window when one of the at least first module and the second module are attached to the baffle. The transparent window and the photodetector are part of an optical link for communicating signals from the at least first module and the second module to electronics in the baffle. At least the first module and the second module include at least one sensor having a pressure sensor, and a velocity sensor substantially co-located with the pressure sensor. In one embodiment, the array of sensors includes a plurality of modules that include the first module and the second module, and each of the plurality of modules is communicatively coupled to at least two adjacent modules so that if one of the plurality of modules fails, signals from the adjacent modules have an alternative path for data output from the adjacent modules. The plurality of modules are communicatively coupled to plurality of other modules so that if one of the plurality of modules fails, signals from the adjacent modules have an alternative path for data output from the adjacent modules. The array, in one embodiment, includes an inductive power connector coupled to the electronics associated with the baffle. Power for the baffle electronics and the at least first module and the second module is received by way of the inductive power connector.

A method for processing signals from a plurality of sensors in an array that have a velocity sensor substantially co-located with a pressure sensor includes receiving a plurality of pressure signals from the plurality of pressure sensor portions of the plurality of sensors at a pressure beamforming component, and receiving a plurality of acceleration signals from the plurality of pressure velocity portions of the plurality of sensors at an accelerometer beamforming component. The method also includes outputting a pressure beam signal from the pressure beamforming component and an accelerometer beam signal from the accelerometer beamforming component to an adaptive beam interpolation component. At the adaptive beam interpolation component, the pressure beam signal and the accelerometer beam signal are combined. In one embodiment, the pressure beam signal and the accelerometer beam signal are adaptively combined. The pressure beam signal and the accelerometer beam signal are combined at the adaptive beam interpolation component to reduce phase noise between the plurality of pressure signals and the plurality of acceleration signals. In one embodiment, combining the signals includes data-adaptive spatial filtering and interference rejection. In still another embodiment, adaptively combining the pressure beam signal and the accelerometer beam signal yields an output $$P(\Theta) = \frac{1}{4}(1 + \cos \Phi)^2$$

where $\Theta$ is the angle of the sound with respect to a radial from the surface of a vessel, and where 1 is the pressure component and $\cos \Theta$ is the accelerometer component of the signal.

A sensor array includes a baffle, and a signal conditioning plate. The baffle and the signal conditioning plate are molded together to form a unit. In another embodiment, a plurality of vibration isolation mounts, the baffle, the signal conditioning plate and the vibration isolation mounts molded together to form a unit. The molded unit can be attached to a hull after the molded unit is formed.

This has been a detailed description of some exemplary embodiments of the invention(s) contained within the disclosed subject matter. Such invention(s) may be referred to, individually and/or collectively, herein by the term "invention" merely for convenience and without intending to limit the scope of this application to any single invention or inventive concept if more than one is in fact disclosed. The detailed description refers to the accompanying drawings that form a part hereof and which shows by way of illustration, but not of limitation, some specific embodiments of the invention, including a preferred embodiment. These embodiments are described in sufficient detail to enable those of ordinary skill in the art to understand and implement the inventive subject matter. Other embodiments may be utilized and changes may be made without departing from the scope of the inventive subject matter. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed:

1. A hull-mounted sensor array including at least one sensor comprising:
   a pressure sensor; and
   a velocity sensor substantially co-located with the pressure sensor to at least partially cancel ownship noise, wherein the sensor is part of an array of sensors, the array of sensors associated with a signal conditioning plate having a thickness in the range of 0.49 inches to 0.15 inches.

2. The sensor of claim 1 wherein the portion of the velocity sensor is located on the central axis of the pressure sensor.

3. The sensor of claim 1 wherein the velocity sensor is an accelerometer located near the central axis of the pressure sensor.

4. The sensor of claim 1 wherein the pressure sensor produces a first signal in response to differences in pressure and the velocity sensor produces a second signal in response to differences in velocity, wherein the first signal and the second signal are combined during a portion of a frequency range, and wherein the first signal is used without the second signal in another portion of the frequency range.

5. The sensor of claim 1 wherein the pressure sensor produces a first signal in response to differences in pressure and the velocity sensor produces a second signal in response to differences in velocity, wherein the first signal and the second signal are combined during a dual band portion of a frequency range, and wherein the first signal is used without the second signal in single band portion of the frequency range, the first signal and second signal communicated to electronics remote from the sensor for signal processing.

6. The sensor of claim 1 wherein the pressure sensor produces a first signal in response to differences in pressure and the velocity sensor produces a second signal in response to differences in velocity, wherein the first signal and the second signal are combined during a dual band portion of a frequency range, and wherein the first signal is used without the second signal in single band portion of the frequency range, the first signal and second signal combined to substantially cancel noise at a selected direction from the sensor array.

7. The sensor of claim 6 wherein the first signal and the second signal are combined to substantially cancel noise at a selected direction from the sensor array, the gain including a backlobe for rejecting noise from the selected direction.

8. The hull-mounted sensor array of claim 1 including at least one sensor wherein the array of sensors is associated with an acoustically hard signal conditioning plate.

9. A hull-mounted sensor array including at least one sensor comprising:
   a pressure sensor; and
   a velocity sensor substantially co-located with the pressure sensor to at least partially cancel ownship noise, wherein the sensor is part of an array of sensors, the array of sensors associated with a signal conditioning plate having a specific acoustic resistance in excess of $3 \times 10^5$ grams/cm$^2$/second.

10. The sensor of claim 9 wherein the portion of the velocity sensor is located on the central axis of the pressure sensor.

11. The sensor of claim 9 wherein the velocity sensor is an accelerometer located near the central axis of the pressure sensor.

12. The sensor of claim 9 wherein the pressure sensor produces a first signal in response to differences in pressure and the velocity sensor produces a second signal in response to differences in velocity, wherein the first signal and the second signal are combined during a portion of a frequency range, and wherein the first signal is used without the second signal in another portion of the frequency range.

13. The sensor of claim 9 wherein the pressure sensor produces a first signal in response to differences in pressure and the velocity sensor produces a second signal in response to differences in velocity, wherein the first signal and the second signal are combined during a dual band portion of a frequency range, and wherein the first signal is used without the second signal in single band portion of the frequency range, the first signal and second signal communicated to electronics remote from the sensor for signal processing.

14. The sensor of claim 9 wherein the pressure sensor produces a first signal in response to differences in pressure and the velocity sensor produces a second signal in response to differences in velocity, wherein the first signal and the second signal are combined during a dual band portion of a frequency range, and wherein the first signal is used without the second signal in single band portion of the frequency range, the first signal and second signal combined to substantially cancel noise at a selected direction from the sensor array.

15. The sensor of claim 14 wherein the first signal and the second signal are combined to substantially cancel noise at a selected direction from the sensor array, the gain including a backlobe for rejecting noise from the selected direction.

16. The sensor of claim 9 wherein the signal conditioning plate has a thickness in the range of 0.49 inches to 0.15 inches.

* * * * *